No. 753,770. PATENTED MAR. 1, 1904.
J. F. WHEELER.
SHOCK FORMER.
APPLICATION FILED JUNE 9, 1902.
NO MODEL. 7 SHEETS—SHEET 2.

WITNESSES:
Frank A. Fahle
J. A. Walsh

INVENTOR
James F. Wheeler
BY
Bradford & Hood
ATTORNEYS

No. 753,770. PATENTED MAR. 1, 1904.
J. F. WHEELER.
SHOCK FORMER.
APPLICATION FILED JUNE 9, 1902.
NO MODEL. 7 SHEETS—SHEET 3.

WITNESSES:
Frank R. Lahle
J. A. Walsh

INVENTOR
James F. Wheeler
BY
Bradford & Hood
ATTORNEYS

No. 753,770. PATENTED MAR. 1, 1904.
J. F. WHEELER.
SHOCK FORMER.
APPLICATION FILED JUNE 9, 1902.
NO MODEL. 7 SHEETS—SHEET 4.
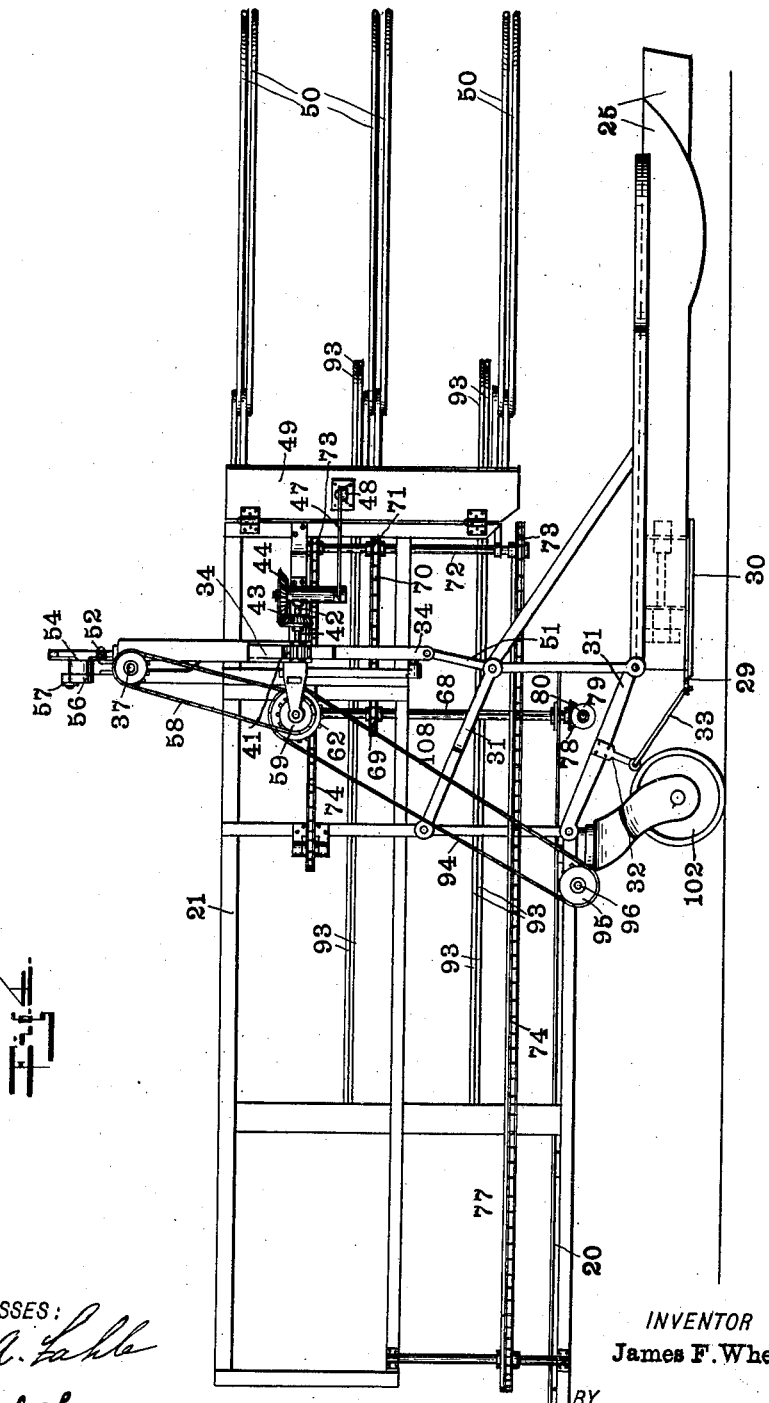
WITNESSES:
INVENTOR
James F. Wheeler
BY
Bradford Hood
ATTORNEYS No. 753,770. PATENTED MAR. 1, 1904.
J. F. WHEELER.
SHOCK FORMER.
APPLICATION FILED JUNE 9, 1902.
NO MODEL. 7 SHEETS—SHEET 5.
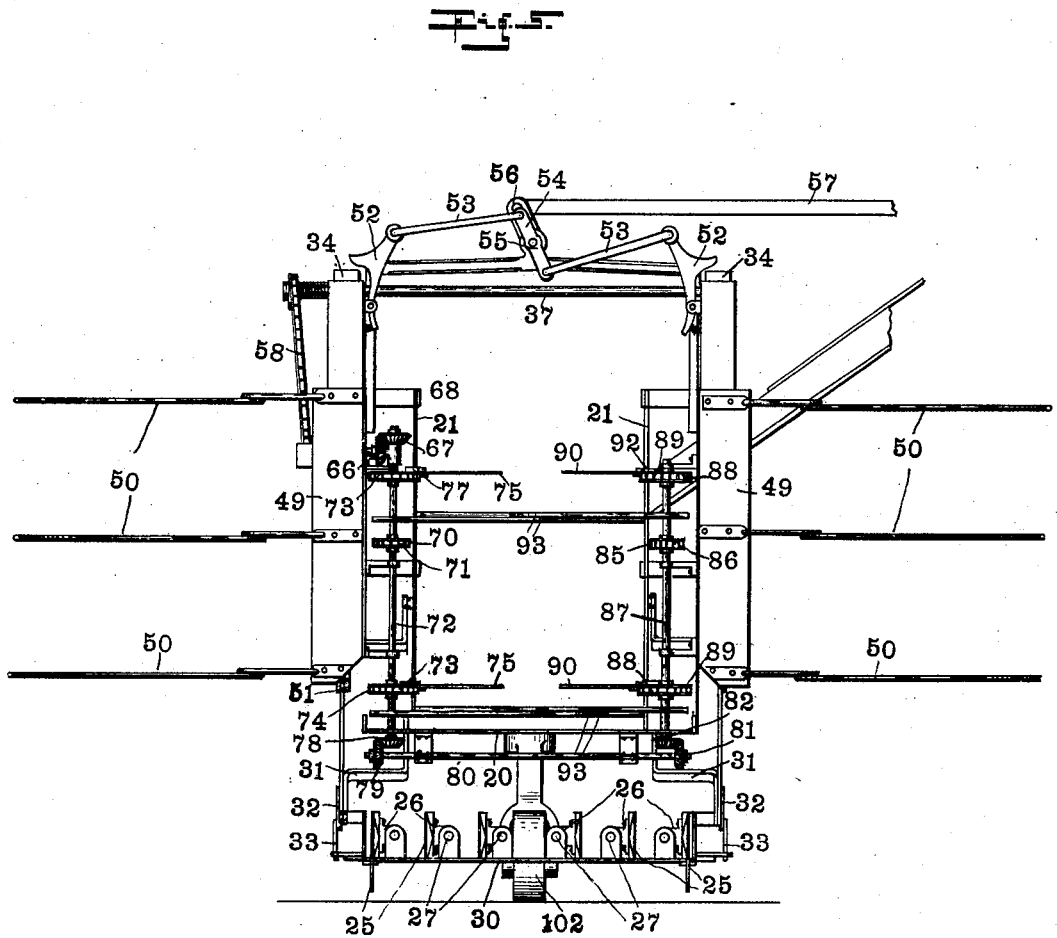
WITNESSES:
INVENTOR
James F. Wheeler
BY
Bradford & Hood
ATTORNEYS

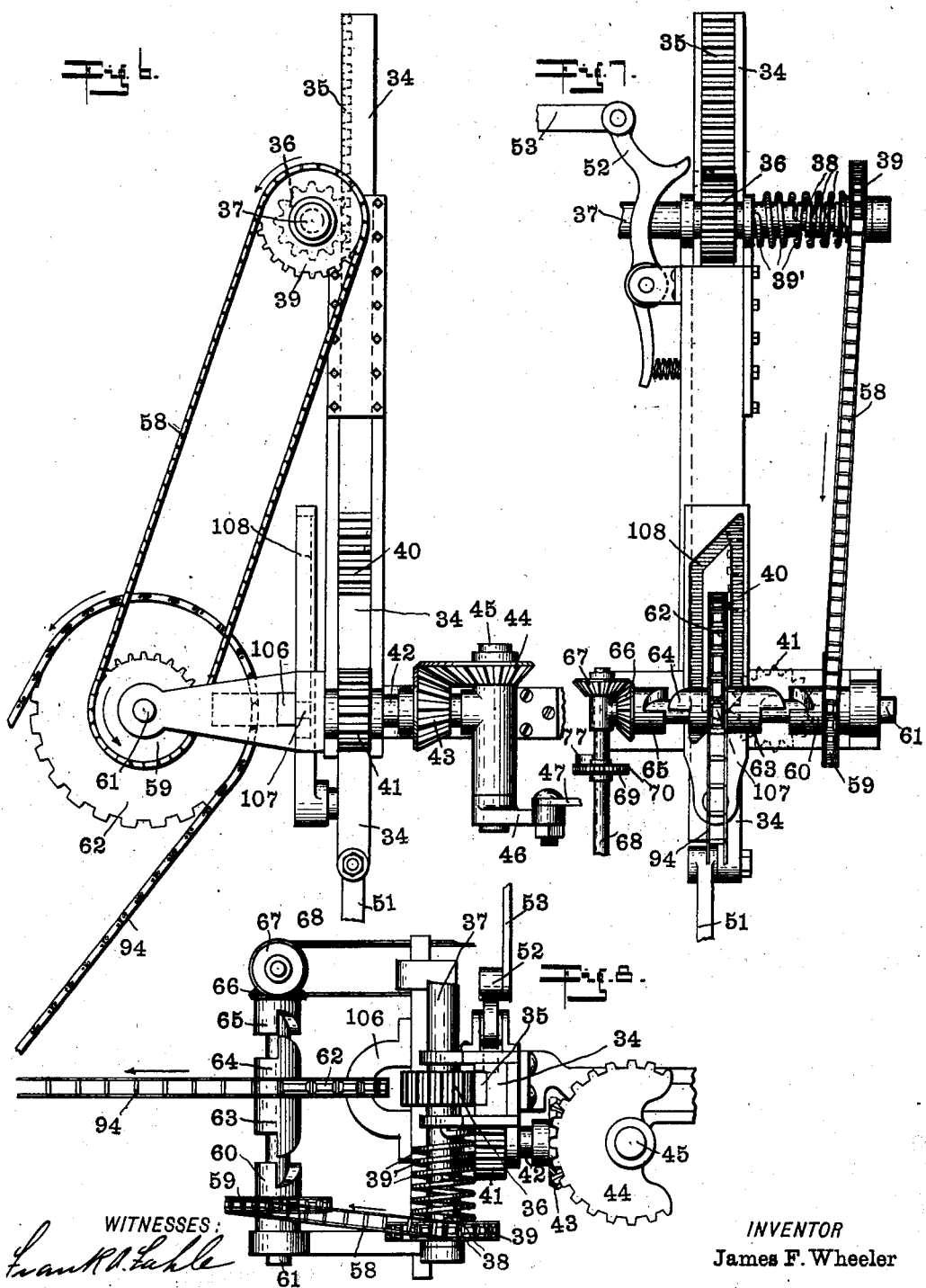

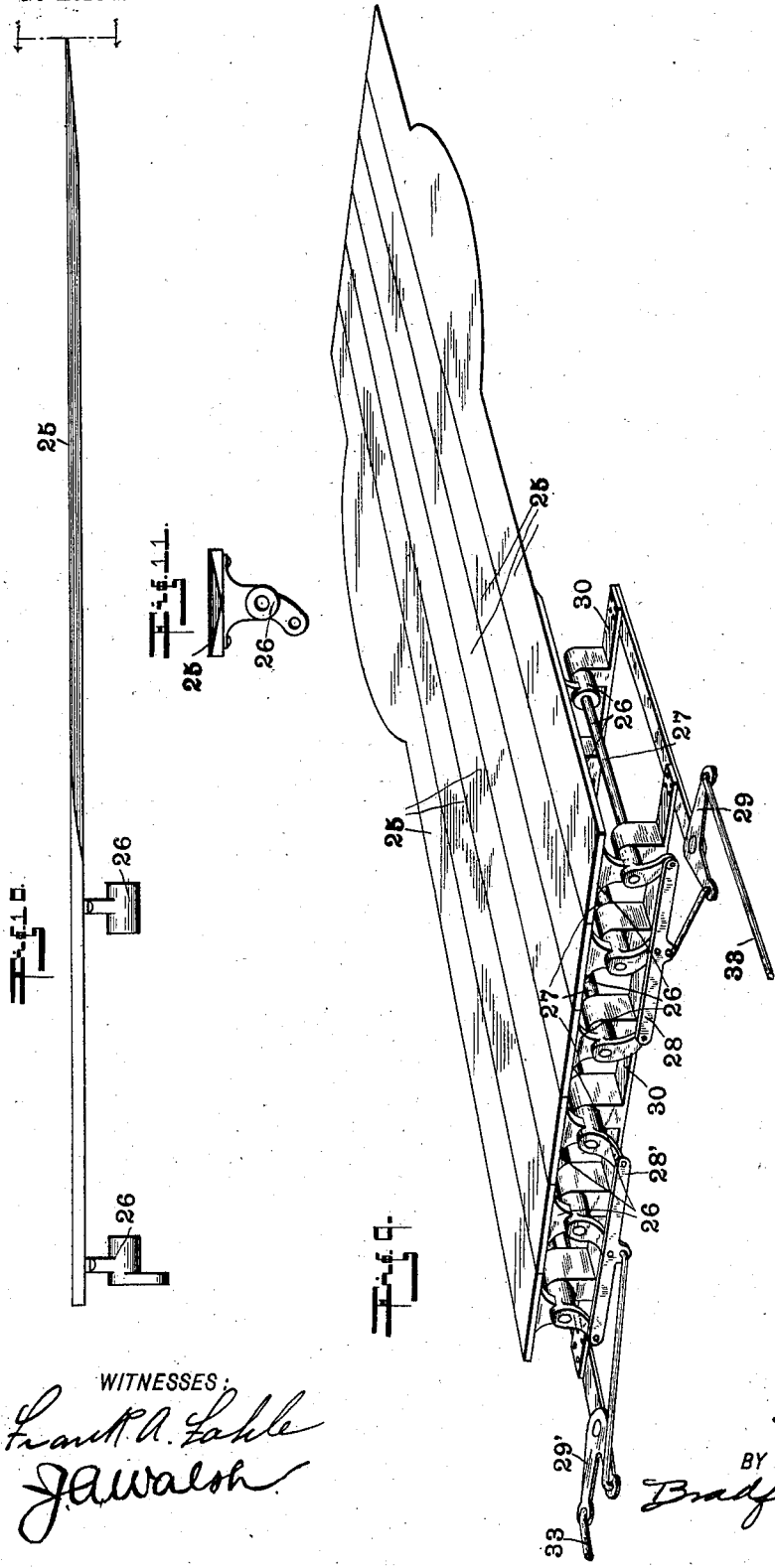

No. 753,770. Patented March 1, 1904.

UNITED STATES PATENT OFFICE.

JAMES F. WHEELER, OF PERRY TOWNSHIP, MARION COUNTY, INDIANA, ASSIGNOR OF ONE-HALF TO AUGUSTIN BOICE, OF INDIANAPOLIS, INDIANA.

SHOCK-FORMER.

SPECIFICATION forming part of Letters Patent No. 753,770, dated March 1, 1904.

Application filed June 9, 1902. Serial No. 110,844. (No model.)

*To all whom it may concern:*

Be it known that I, JAMES F. WHEELER, a citizen of the United States, residing in Perry township, in the county of Marion and State of Indiana, have invented certain new and useful Improvements in Shock-Formers, of which the following is a specification.

There are at the present time bundle-carriers for self-binding harvesters which receive and retain a series of bundles from the binding mechanism of a harvester, such bundles remaining on their sides as bound and being discharged from the machine by the bundle-carrier upon the ground, but lying flat upon the ground in such manner that another operator is required to stand the bundles butt-end down in the form of a shock.

The object of my invention is to provide a mechanism which is adapted to receive successive bundles of grain or other crop and gather said bundles butt-end down into the form of a shock and automatically deposit said shock in an upright and permanent position upon the ground, the mechanism shown and described herein being particularly designed for attachment to or to form a part of a self-binding harvester. It is to be understood, however, that my device may be used for shocking a crop which is not previously bundled without departing from my invention.

The accompanying drawings illustrate my invention as applied to a self-binding harvester.

Figure 1:
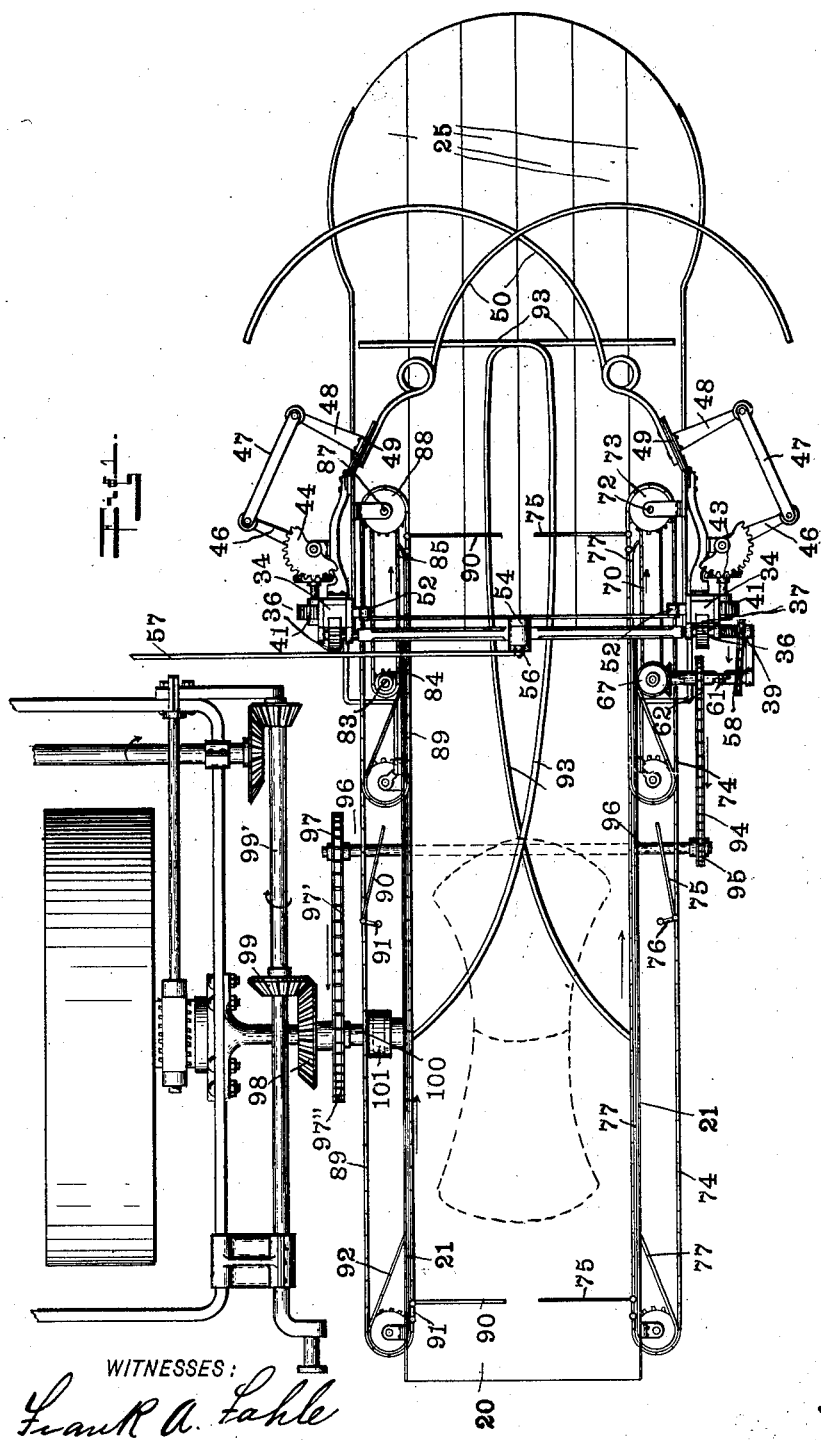
Figure 2:
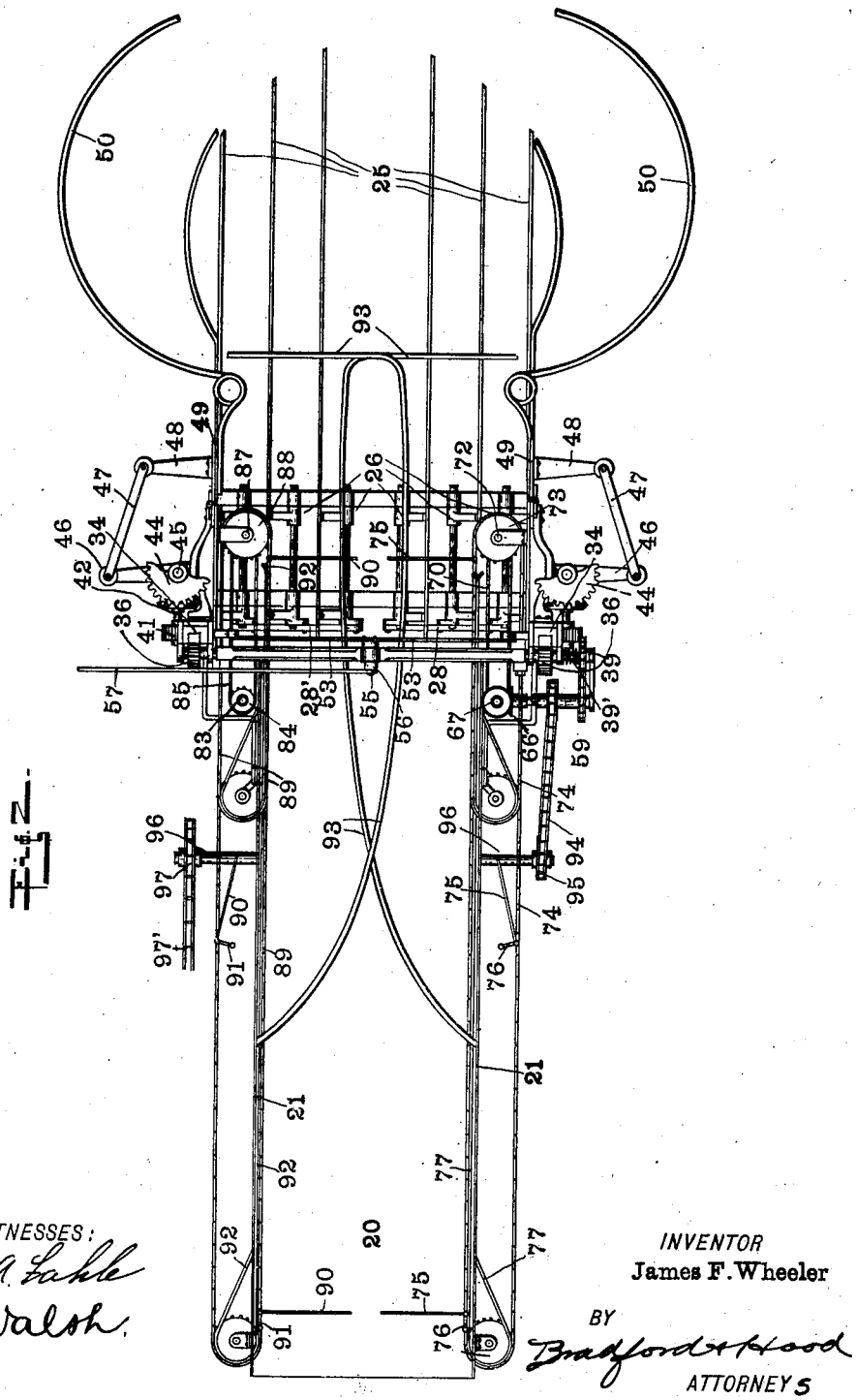

Figure 1 is a plan with the parts in the position assumed to receive the bundles of grain from the harvester. Fig. 2 is a similar view with the parts in the position assumed during the discharge of the shock. Fig. 3 is a side elevation with the parts in the position shown in Fig. 1. Fig. 4 is a similar view with the parts in the positions shown in Fig. 2. Fig. 5 is a rear elevation of the parts, as shown in Fig. 2. Fig. 6 is a side elevation of the gate-operating mechanism on a scale larger than the preceding figures. Fig. 7 is a front elevation of the parts shown in Fig. 6. Fig. 8 is a plan thereof. Fig. 9 is a perspective view of the shock-forming platform. Fig. 10 is a side elevation of one of the fingers of which the shock-forming platform is composed, and Fig. 11 is an end elevation of said finger.

In the drawings, 20 indicates a suitable bundle-receiving platform provided at each side with suitable walls 21. Forming a continuation of the platform 20 at the rear end thereof is a shock-forming platform composed of a plurality of plates, slats, or fingers 25, each of which is supported upon the upper ends of suitable levers 26. Each lever 26 is pivoted upon a suitable shaft or support 27, each of which lies beneath its finger 25 at the forward end thereof.

In the drawings I have shown the shock-receiving platform as composed of six fingers 25, which are connected into two groups upon opposite sides of the center line by means of links 28 and 28', which links are connected to one arm of each of the levers 26. The links 28 and 28' are connected to bell-crank levers 29 and 29', respectively, by means of which they are operated. Shafts 27 are supported upon a transverse frame 30. Frame 30 is supported at each side upon the rear ends of a pair of links 31, which are pivoted thereto and which are pivoted at their forward ends to the adjacent side 21, the two links 31 thus forming a usual construction for parallel motion. Extending from the lower one of each pair of links 31 is an arm 32, between which and the outer arm of the adjacent bell-crank lever 29 or 29' is a link 33.

Vertically reciprocable upon each side 21, near its rear end, is a rack-bar 34, provided upon one face with suitable teeth 35, which mesh with a pinion 36, the two pinions being carried by a transverse shaft 37. Shaft 37 is provided near one end with threads 38, upon which is mounted a sprocket-wheel 39, the amount of longitudinal movement upon the shaft being limited by the length of the thread and the sprocket-wheel being normally forced to the outer end of the shaft by a torsion-spring 39'. Rack-bar 34 also carries upon one face teeth 40, which when the rack-bar is moved downward are brought into engagement with a pinion 41, carried by a shaft 42, journaled in suitable journals on the adjacent side 21. Shaft 42 carries a bevel-pinion 43, which meshes with a pinion or segment 44, carried by a vertical shaft 45, journaled upon the side frame and carrying an arm 46. Arm 46 carries a link 47, the rear end of which is connected to an arm 48, carried by a gate 49, hinged upon a vertical axis to the rear end of the adjacent side 21. Gate 49 carries a plurality of rearwardly and inwardly extending shock-forming fingers 50, which extend to the rear and across the shock-forming table. Each rack-bar 34 is connected to the adjacent link 31 or to any desirable portion of the frame 30 or the parts carried thereby by a link 51. In order to hold the rack-bars 34 in their upper positions, I mount adjacent each of said rack-bars a catch 52, adapted to engage the adjacent rack-bar. Each catch 52 is connected by a link 53 with an operating-arm 54, carried by a rock-shaft 55, which may be provided with a suitable operating-arm 56, from which extends a link or rod 57, carried to easy reach of the operator of the harvester.

Sprocket-wheel 39 is connected by a suitable belt 58 to a sprocket-wheel 59, provided with a clutch member 60. Sprocket 59 is sleeved upon a counter-shaft 61. Sleeved upon counter-shaft 61 is a sprocket-wheel 62, provided on one side with a clutch member 63, adapted to engage clutch member 60, and on the other side with a clutch member 64, adapted to engage with a clutch member 65, carried by a bevel-gear 66, also sleeved upon the counter-shaft. Gear 66 meshes with a gear 67, carried at the upper end of a vertical shaft 68, mounted in suitable bearings supported by the adjacent side 21, and this shaft carries a sprocket-wheel 69, over which is passed a sprocket-chain 70, which passes to and around a sprocket-wheel 71, carried by a vertical shaft 72, located at the rear end of said side 21. Shaft 72 carries a pair of sprocket-wheels 73, over each of which is passed a feed-belt 74. Each belt 74 carries a plurality of feeder-fingers 75, pivoted to the chain. Each finger 75 is provided with a rear arm 76, adapted to be engaged by a track 77, which track operates to maintain the feed-fingers 75 in operative position at desired portions of its travel in a well-known manner. Shaft 68 is extended down below the platform 20 and is provided at its lower end with a gear 78, which meshes with a gear 79, carried by a shaft 80, extending transversely across beneath the platform and carrying at its opposite end a gear 81. Gear 81 meshes with a gear 82, carried by a vertical shaft 83, which shaft carries a gear 84. Sprocket 84 is connected by a sprocket-chain 85 with a sprocket-wheel 86, carried by a vertical shaft 87, similar in arrangement to shaft 72. Shaft 87 carries sprocket-wheels 88, over which pass feed-belts 89, carrying feed-fingers 90, similar to the feed-fingers 75 and provided with rear arms 91, engaging track 92. Arranged above platform 20 are spring-guards 93, which project rearward over the shock-forming platform. Gear 62 is driven by a belt or chain 94, which passes over a driving-wheel 95, carried by a transverse shaft 96, passing beneath the platform 20 and provided with a sprocket-wheel 97. Passing over wheel 97 is a chain 97', which also passes over sprocket-wheel 97", connected to a gear 98. Gear 98 meshes with a gear 99, carried by a shaft 99', which shaft is preferably any desired continually-moving shaft of the harvester.

The mechanism described may be supported adjacent the knotter-table of a harvester in any desired manner, so that it will be carried along with the harvester. A desirable way to accomplish this is by means of a stud-shaft 100, secured to one side of the buncher near its forward end and adapted to pass into a socket 101, connected to the harvester. The rear end of the buncher will then be supported by a caster-wheel 102, attached to the rear of the platform 20. Such a connection allows necessary independent movement of the buncher due to inequalities of the ground over which the machine may pass.

The gear 62 is engaged by a shifting yoke 106, which is mounted in suitable bearings to travel parallel with shaft 61, and this yoke is provided with a pin 107, which projects into the slot of a cam-plate 108, connected to the adjacent rack-bar 34, so that as the rack-bar moves down it will operate to throw sprocket-wheel 62 upon shaft 61 to withdraw the clutch member 64 from engagement with the clutch member 65 and throw clutch member 63 into engagement with clutch member 60, the operation being in the reverse order when the rack-bar is moved upward.

The operation is as follows: After being connected to the harvester the normal position of the parts will be that shown in Figs. 1 and 3, in which the shock-forming platform formed by fingers 25 will lie in substantially the same plane as the bundle-receiving platform 20. Catches 52 are in engagement with the rack-bars 34, said rack-bars being held in their extreme upper positions by the catches and the shock-forming fingers 50 being held together over platform 25, as shown in Fig. 1, and clutch member 64 being held in engagement with clutch member 65, so that as the machine advances the feeder-belts 74 and 89 are driven in the direction indicated by the arrows, so as to cause fingers 75 and 90 to move longitudinally above platform 20 toward the rear. As the machine is drawn forward by the harvester, a bound bundle 105, as shown in dotted lines in Fig. 1, will be released by the binder-and-knotter mechanism in the usual manner and will drop from the knotter-platform onto the bundle-receiving platform 20, the head end of the bundle being supported by the springs 93 93, while the butt-end of the bundle continues to drop until it rests upon the platform 20. Fingers 75 and 90 move rearward, the fingers of the lower belt engaging the butt-end of the bundle, so as to straighten the bundle up, (the upper end of the bundle being retarded by the springs 93,) and when the bundle is substantially straight the fingers 75 and 90 of the upper and lower belts on opposite sides engage the bundle squarely and force it toward the rear along platform 20, the springs 93 yielding before the bundle and the bundle being carried rearward onto the forward ends of the fingers 25 about opposite shafts 72 and 87, at which point the rear arms of the feeder-fingers are passed beyond their respective tracks, so that the feeder-fingers may be drawn back along the outsides of the belts without interfering with the other mechanism, in a well-known manner. The next bundle will be carried to the rear in the same manner and will operate to force the preceding bundle farther to the rear, so that it will pass out from between the rear ends of the springs 93 onto the rear ends of the fingers 25. The bundles will be successively forced to the rear upon the shock-forming platform until a sufficient number has been packed in between the fingers 50 to form a shock, said fingers yielding as the number of bundles increase. The operator will then pull upon link 57, (this operation may of course be made automatic without departing from my invention,) so as to withdraw catches 52 from the rack-bars 34. The weight of the shock-forming platform, together with the shock thereon, will operate to throw said platform down to the position shown in Fig. 4, said platform being held horizontal by the action of the links 31. As the shock-forming platform moves down, arms 32 pull upon links 33, so as to swing bell-crank levers 29 29', and thus through links 28 and 28' pull upon levers 26, so as to swing the fingers 25 upon their shafts 27 and turn said fingers upon edge, the inner edges of the fingers moving upward and outward, so as to thus first move up into the shock and then move outward, so as to spread the butt-ends of the straw and allow the shock to slip downward onto the ground, the butt-ends being thus spread so as to widen the base of the shock. The downward movement of the shock-forming table operates through links 51 to pull rack-bars 34 downward, and when said rack-bars have been brought about half-way of their downward movement, at which time the shock will not have reached the ground, the teeth 40 are brought into engagement with gear 41, so as to rotate said gear and the gear 43, attached thereto, thus rotating the gear or segment 44, so as to swing arm 46, which through link 47 operates upon the adjacent gate 49, so as to quickly swing said gate open and withdraw the fingers 50 thereof from the shock, the fingers 50 being separated, as shown in Fig. 2, so as to allow the machine to be drawn forward away from the shock. As the rack-bar 34 pass downward they carry the cam-plate 108 downward, so as to shift yoke 106, and thereby withdraw clutch member 64 from engagement with clutch member 65, so that the feed-belts 74 and 89 are temporarily stopped and clutch member 63 is thrown into engagement with clutch member 60, so that sprocket-wheel 59 is rotated. The rotation of the sprocket-wheel 59 operates through sprocket-chain 58 to rotate sprocket-wheel 39. The first few rotations of sprocket 39 are free upon shaft 37, due to the threads 38, so that the shaft 37 is not immediately rotated, and this freedom of rotation continues until the machine has advanced far enough to withdraw fingers 25 from the shock which has been deposited upon the ground. As soon as this withdrawal has been accomplished, however, sprocket-wheel 39 has moved to the limit of its longitudinal movement on the shaft 37 and thereafter rotates said shaft so as to rotate pinions 35, and thus operate upon rack-bars 34 to raise the same to their initial positions, catches 52 swinging into engagement with the rack-bars when they have reached their upper position. As the frame 30 is drawn up by the rack-bars 34 the fingers 25 are returned to their normal positions by the action of arms 32, links 33, bell-crank levers 29 and 29', and links 28 and 28'. Gates 49 are also closed by the consequent rotation of gears 41. As the rack-bars 34 reach their upper positions sprocket-wheel 62 is returned to its initial position, so as to throw clutch member 64 into engagement with clutch member 65 (thus starting the feed-belts 74 and 89) and withdraw clutch member 63 from engagement with clutch member 60, so as to release sprocket-wheel 59. As soon as sprocket-wheel 59 is released, the torsion-spring 39' operates to rotate sprocket-wheel 39 in the opposite direction, and thus return said gear to the opposite end of thread 38. The several parts are thus in initial positions and the operation described is repeated.

While I have described the machine as driven by the harvester, it may, if desired, have independent driving-wheels without departing from my invention, the particular means for connecting the machine to the self-binder or for driving the various moving parts of my device being immaterial so long as the buncher be connected and operated in such manner as to be capable of receiving the bundles of crop from the self-binder and collecting a sufficient number thereof into the form of a shock and depositing such shock automatically upon the ground butt-end down.

I claim as my invention—

1. In a shocking apparatus, a dumping-platform consisting of a plurality of slats supported upon substantially horizontal axes, means for moving said platform bodily vertically toward and from the ground, and means for swinging the slats upon their axes.

2. In a shocking apparatus, a dumping-platform consisting of a plurality of slats supported upon substantially horizontal axes, means for moving said platform vertically toward and from the ground, and means for swinging the slats upon their axes when they are moved toward and from the ground.

3. In a shocking apparatus, a dumping-platform consisting of a plurality of slats supported upon substantially horizontal axes, means for moving said platform bodily vertically toward and from the ground, and means for swinging the slats in two groups in opposite directions from a medial line.

4. In a shocking apparatus, a dumping-platform consisting of a plurality of slats supported upon substantially horizontal axes, means for moving said platform bodily vertically toward and from the ground, and means for operating upon the vertical movement of the platform for swinging the slats in two groups in opposite directions from a medial line.

5. In a shock-forming apparatus, a dumping-platform consisting of a plurality of slats supported upon substantially horizontal axes, means for moving said platform toward and from the ground, and means for swinging the slats in two groups in opposite directions from a medial line.

6. In a shock-former, the combination of a supporting-frame, a plurality of fingers pivotally mounted upon said frame whereby they may be turned upon edge, means for vertically reciprocating said frame, and means for swinging the fingers upon edge when the frame is lowered and for returning the fingers to initial position when the frame is raised.

7. In a shock-former, the combination of a supporting-frame, a plurality of fingers composing a shock-forming platform, each of said fingers being pivotally supported upon a substantially horizontal axis, connections between the fingers on each side of a longitudinal center grouping the fingers into two groups, means for vertically reciprocating the supporting-frame, and means connected to the reciprocating means for turning the fingers of the two groups on edge in opposite directions from the center out when the frame is lowered whereby the butt-ends of the shocked material are separated so as to spread the base of the shock and thereafter the shock is deposited upon the ground.

8. In a shock-former, the combination, with a vertically-reciprocable shock-forming platform, of a pair of gates arranged above said platform, a pair of rack-bars, and intermediate connecting-gearing between said rack-bars and gates and between the platform and rack-bars whereby a reciprocation of the platform will reciprocate the gates.

9. In a shock-former, the combination, with a receiving-platform, of a shock-forming platform arranged to receive material from the receiving-platform and consisting of a plurality of fingers, a support for each of said fingers whereby it may be turned on edge, means for turning said fingers upon edge, a pair of gates hinged at opposite sides of the shock-forming platform, a pair of rack-bars, intermediate connecting-gearing between each of said rack-bars and one of the gates, and means for reciprocating said rack-bars so as to swing the gates.

10. In a shock-former, the combination with a receiving-platform, of a supporting-frame, a shock-forming table consisting of a plurality of fingers pivotally mounted on said frame, intermediate connections between said supporting-frame and the receiving-platform whereby said frame with its fingers may be vertically reciprocated, means for turning said fingers upon edge when the supporting-frame is moved downward, a pair of gates arranged above the shock-forming platform, a pair of rack-bars, intermediate connecting-gearing between each of said rack-bars and one of said gates, and intermediate connections between the rack-bars and the supporting-frame, substantially as and for the purposes set forth.

11. In a shock-former, the combination with a platform, of a supporting-frame, a pair of links pivotally connected to the frame at one end and pivotally connected to the receiving-platform at the other end whereby the frame may be vertically reciprocated, a plurality of fingers pivotally mounted upon the supporting-frame upon substantially horizontal axes, a lever connected to each of said fingers, a pair of links connecting said levers into two groups upon opposite sides of a longitudinal medial line, a bell-crank lever connected to each of said groups of levers, a connection between said bell-crank lever and the adjacent link which connects the supporting-frame to the receiving-platform, a pair of gates arranged over the shock-forming platform, and connections between the supporting-frame and the said gates for swinging the gates when the supporting-frame is reciprocated.

12. In a shock-former, the combination with a receiving-platform, of a vertically-reciprocable supporting-frame, a plurality of fingers pivotally supported upon said frame upon substantially horizontal axes to form a shock-forming platform, a pair of rack-bars, connections between said rack-bars and the supporting-frame, a shaft, a pair of pinions carried by said shaft and engaging the rack-bars, a thread formed in said shaft, a driving-wheel threaded upon said threads, and means for driving said driving-wheel whereby, after the supporting-frame has moved downward and its fingers turned on edge the driving-wheel may be rotated freely upon its shaft a desired number of revolutions before it positively engages the shaft so as to rotate the pinions thereof to drive the rack-bars upward to return the supporting-frame and its fingers to initial position.

13. The combination, with a self-binding harvester, of a receiving-platform, means for attaching said receiving-platform in position to receive bundles from the harvester, a shock-forming platform consisting of a plurality of fingers, means for transferring the bundles in succession from the receiving-platform upon said fingers, means for gathering said bundles in a shock upon said fingers butt-end down, means for turning said fingers upon edge whereby the shock may drop butt-end down upon the ground, and means for withdrawing the shock-forming mechanism from the deposited shock.

14. In a shocking apparatus, a frame, a transverse member mounted to move vertically thereon, fingers forming a bottom carried by said transverse member and mounted so as to turn thereon, means for vertically moving the transverse member, and means for turning the fingers upon the vertical movement of the transverse member.

15. In a shocking apparatus, a dumping-platform arranged to move bodily toward and from the ground and including fingers turnable upon longitudinal axes, means for vertically moving the platform, and means for turning said slats simultaneously with the vertical movement of the platform.

In witness whereof I have hereunto set my hand and seal, at Indianapolis, Indiana, this 27th day of May, A. D. 1902.

JAMES F. WHEELER. [L. S.]

Witnesses:
 ARTHUR M. HOOD,
 JAMES A. WALSH.